Patented Mar. 17, 1936

2,034,580

UNITED STATES PATENT OFFICE 2,034,580

CHLORINATED DIPHENYL-SULPHUR MIXTURES

Russell L. Jenkins and Glennon Hardy, Anniston, Ala., assignors to Swann Research, Incorporated, a corporation of Alabama No Drawing. Application April 21, 1930, Serial No. 446,177

1 Claim. (Cl. 106—22)

This invention relates to a new composition of matter which has valuable properties in the field of plastics, as an impregnating agent and in other uses where a cheap waterproof binder is required.

One of the principal objects of our invention resides in the production of a material for molded articles which is of superior quality and which can be heat and pressure molded.

Another object of our invention is the provision of a material for molded articles which is highly water-resistant, non-toxic and has a high electrical resistance, making it especially valuable as an impregnating or potting compound, as well as for other uses.

We have discovered that resins comprising chlorinated diphenyl or related chlorinated diaryls are miscible with sulphur. We have further discovered that such mixtures may be utilized as a binding agent for a wood flour or related cellulosic materials in the production of molded articles. We have also discovered that the chlorinated diaryls have the property of rendering sulphur less flammable.

The particular chlorinated diaryls which we have found useful for our purpose are chlorinated diphenyl and those diaryls related to diphenyl and now on the market under the trade name "Aroclor". We will refer to these materials as diphenyl resins and designate the particular resin by its softening point or chlorine content.

In the prior filed applications of Russell L. Jenkins, Serial Nos. 395,737 and 395,738, both filed September 28, 1929, there is shown, described and claimed processes for producing such resins. Other methods of producing chlorinated diphenyl are described in Liebig's Annalen der Chemie, vol. 189 (1877) pages 135 to 145. In general, these resins are produced commercially by subjecting diphenyl and related diaryls to the action of chlorine in the presence of a suitable catalyst until the desired percentage of chlorine has been substituted in the diphenyl and related diaryls. The process is usually carried out in an enclosed vessel employing iron or iodine as a catalyst and provided with a suitable outlet for the evolved HCl.

Various combination of the chlorinated diphenyl or diaryl mixtures can be made. We will describe a few of them and indicate other mixtures which can be similarly produced, and which are within the scope of this invention.

Mix together ten per cent of sulphur and ninety per cent of chlorinated diphenyl having a chlorine content of 63 to 64 per cent and a softening point of 71.5° C. by the A. S. T. M. test. Heat to the melting point, stir until homogeneous, and allow to cool. If a black chlorinated diphenyl or "Aroclor" is used, a black brittle wax slightly sticky at ordinary temperatures will be obtained. If a clear chlorinated diphenyl or "Aroclor" is used in the mixture, a light-yellow, brittle wax, slightly sticky at ordinary temperatures will be obtained.

By employing the same chlorinated diphenyl mentioned above in smaller proportions, i. e., larger amounts of sulphur, we have found that the hardness of the wax may be appreciably varied. For example, when a mixture of 20% sulphur and 80% chlorinated diphenyl is melted together and allowed to cool, the mixture is quite pliable at ordinary temperatures, whereas when the proportions are further changed to contain 30% of sulphur and 70% of chlorinated diphenyl, the wax is somewhat more flexible.

Further variation of the physical properties of these waxes may be made by using a chlorinated diphenyl resin of either higher or lower chlorine content. If a chlorinated diphenyl resin of higher chlorine content is employed, a harder wax will be obtained. If a lower chlorinated diphenyl resin is employed, a softer wax will be obtained.

In the production of sulphur containing plastics, our compositions are of especial value. They may be used as a binder for such fillers as talc, chalk, wood flour, or other cellulosic materials. The incorporation of our chlorinated diphenyl-sulphur "binder" with filler may be effected by stirring the ingredients together in a heated mixer such as is used in the plastic arts. The mixer is heated above the temperature at which the "binder" is fluid, the filler stirred in and mixing continued until the ingredients are thoroughly mixed.

The proportions in which the wood flour or other filler and "binder" are mixed together and the properties of the product may vary considerably, depending upon the type of chlorinated diphenyl resin. For example, by employing a diphenyl resin having a high softening point in the binder a strong relatively inflexible plastic is obtained. On the other hand, by employing in the "binder" a "softer" resin, we obtain a more flexible plastic.

While we have described our invention in several forms, it will be obvious to those skilled in the art that it is not so limited, but is susceptible of various other changes and modifications, without departing from the spirit thereof, and we desire, therefore, that only such limitations shall be placed thereupon as are imposed by the prior art, or as are specifically set forth in the appended claim.

What we claim is:

A plastic mixture for heat and pressure molding which comprises a filler of finely divided cellulosic materials and a binder therefor comprising a mixture of sulphur and a chlorinated diphenyl resin, said resin having a chlorine content of more than 60% and comprising more than 70% of said binder material.

RUSSELL L. JENKINS.
GLENNON HARDY.